United States Patent [19]

Husted

[11] 4,035,035
[45] July 12, 1977

[54] PROPULSION CLEAT FOR A POWER-DRIVEN SKI
[75] Inventor: Royce Hill Husted, Wheaton, Ill.
[73] Assignee: Saroy Engineering, Wheaton, Ill.
[21] Appl. No.: 599,003
[22] Filed: July 25, 1975
[51] Int. Cl.² .................................. B62D 55/26
[52] U.S. Cl. .............................. 305/13; 180/9.64; 280/11.11 E; 305/35 R
[58] Field of Search ........ 305/13, 46, 35 R, 35 EB, 305/53; 280/11.11 E, 11.1 ET; 180/9.64, 9.62, 1 G

[56] References Cited
U.S. PATENT DOCUMENTS

| 2,339,273 | 1/1944 | Knox | 305/13 X |
| 3,782,787 | 1/1974 | Rubel et al. | 305/35 EB |
| 3,853,192 | 12/1974 | Husted | 280/11.11 E X |

FOREIGN PATENT DOCUMENTS

| 289,507 | 5/1967 | Australia | 305/46 |
| 200,017 | 7/1923 | United Kingdom | 305/13 |

Primary Examiner—Robert B. Reeves
Assistant Examiner—John P. Shannon
Attorney, Agent, or Firm—Samuel Shiber

[57] ABSTRACT

In a tread for a power-driven ski having a chain with a plurality of spaced propulsion cleats, an outwardly protruding propulsion cleat, constructed with a venting passage and with resiliency to enable it to withstand the dynamic forces associated with its protruding construction, and to vent snow which is continuously becoming trapped between itself and the sprockets, while the cleat swings over and around these sprockets.

10 Claims, 14 Drawing Figures

PROPULSION CLEAT FOR A POWER-DRIVEN SKI

BACKGROUND OF THE INVENTION

The present invention relates to a tread for propulsion in snow, and particularly to a tread for a power-driven ski type of a device which may be a power-driven ski, a power-driven ski-bob, a power-driven toboggan, a snowmobile or other light snow going device. Throughout this patent I will discuss the cleat as it applies to a power-driven ski with the understanding that similar considerations hold true in the case of other devices of this type.

Power-driven ski is a newcomer to the small family of motorized winter sports devices, and it has been described in detail in my U.S. Pat. No. 3,853,192, issued on Dec. 10, 1974, which is herein incorporated by reference.

Basically, the ski is propelled by a tread which circulates around the posterior ski portion at a linear pitch-line speed which is approximately equal to the ski's ground speed, which may exceed 30 m.p.h. The tread is circulateably supported by sprockets which are preferably small in order to keep the ski's profile compact and for other reasons discussed in my above mentioned patent. Consequently, the tread swings around the sprocket at high angular speeds, and the portions of the tread that protrude outwardly from the tread's pitch-line experience sharp acceleration and deceleration upon starting and ending, respectively, their travel over the sprocket, in addition to the centrifugal forces.

Operating a mechanical device with moving parts in a snow environment poses some unique problems. Snow may readily transfer from fluffy powder to water or to hard ice, depending of the temperature and mechanical conditions it is subjected to. When the tread circulates over the sprockets it tends to accept a build up of snow which is packed, centrifugally and mechanically, between the cleats and the sprocket, until it interferes with the proper engagement between the two, often causing early mechanical failure of the tread, and in many instances of the ski posterior body portion. Therefore, it seems essential to prevent such build up of snow by preventing the entrapment of snow between the cleats and the sprockets.

Some of the objects of the present invention are to provide a propulsion cleat for a power-driven ski's tread that would withstand the inherent mechanical punishment, while effectively providing a forward thrust to the ski, and which will not entrap snow that may interfere with the tread engagement with the sprocket.

DETAILED DESCRIPTION OF THE FIGURES

Figure 1:
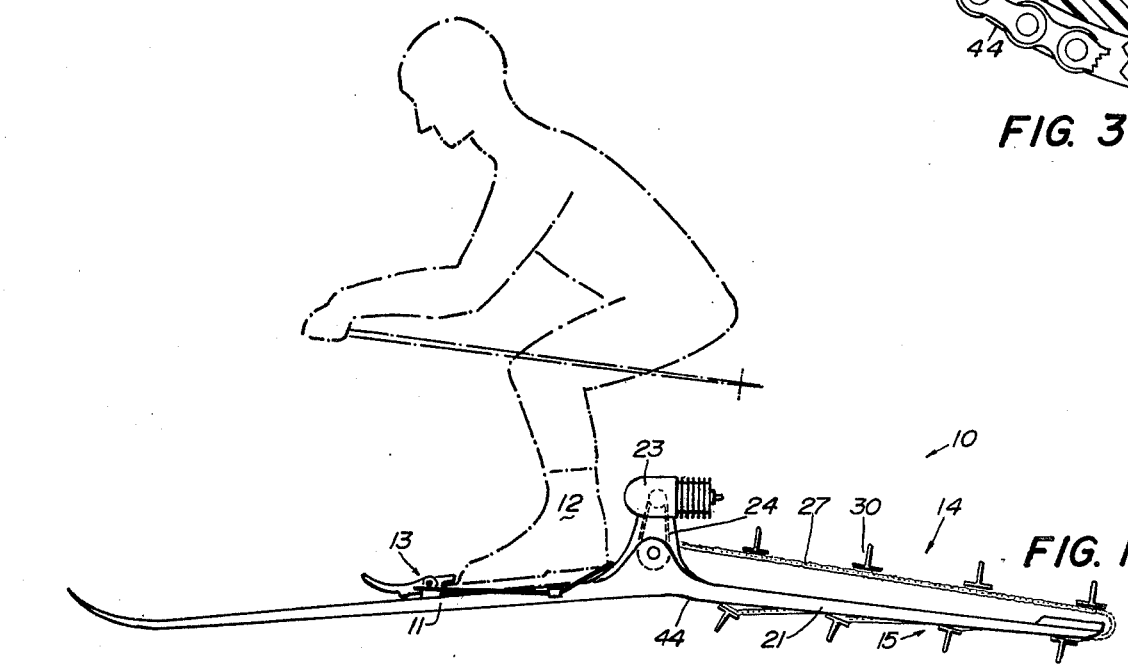
FIG. 1 is a general side view of a skier using a power-driven ski.
Figure 2:
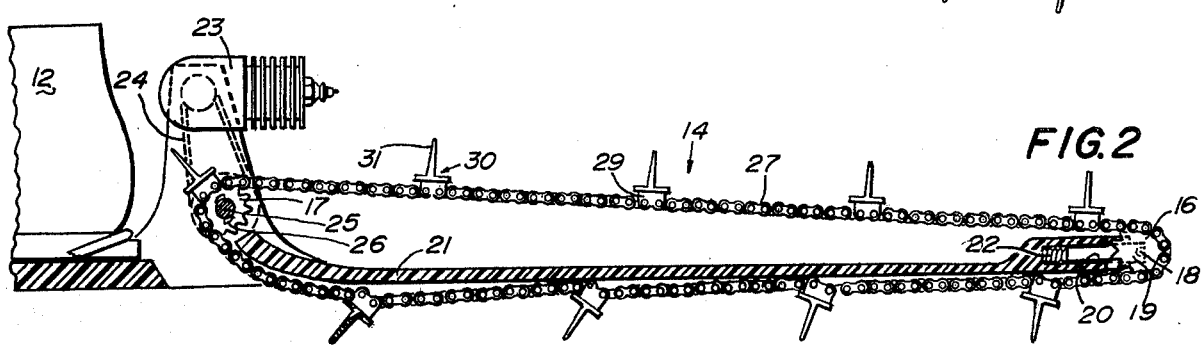
FIG. 2 is a sectional side view of the posterior portion of the power-driven ski.

FIG. 1 is a general side view of a skier using a power-driven ski 10 having an anterior ski portion 11 to which a skier's boot 12 is attached by a conventional binding mechanism 13, and a posterior ski portion 14 around which a propulsion tread 15 is circulateably supported by an idler sprocket 16 and a drive sprocket 17 throughout the figures same parts are indicated by same numerals. The idler sprocket 16 is circulateably supported through a shaft 18 by a piston 19 which is slidingly supported, in a cylinder 20 formed at the rear end of the body 21 of the posterior portion 14, by a helical compression spring 22 which is shown in a fully compressed position in FIG. 2. A light weight internal combustion engine 23 drives the tread 15 through a chain 24 which transmits power to a drive shaft 25 to which the drive sprocket 17 is coupled through a one-way clutch mechanism 26 formed in its hub (note FIGS. 3 & 4). Further details regarding the power-driven ski, per se, are available in my previously mentioned patent.

Figure 10:
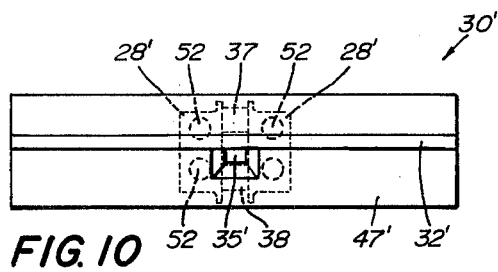
FIG. 10 shows a second embodiment of a propulsion cleat, as viewed from its snow engaging side.
Figure 5:
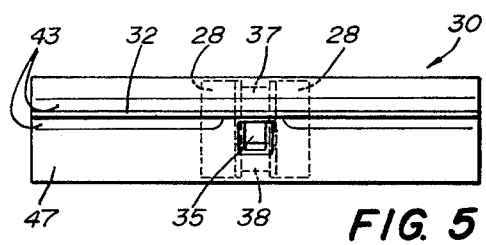
FIG. 5 shows a first embodiment of a propulsion cleat, as viewed from its snow engaging side.
Figure 11:
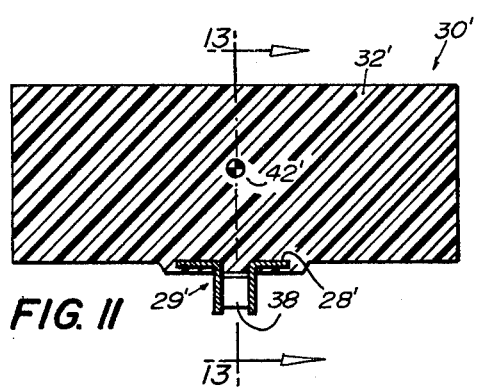
FIG. 11 shows a rear view of the cleat of FIG. 10.
Figure 6:
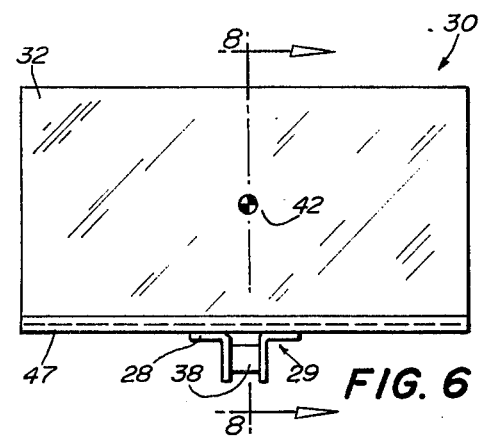
FIG. 6 shows a rear view of the cleat of FIG. 5.
Figure 12:
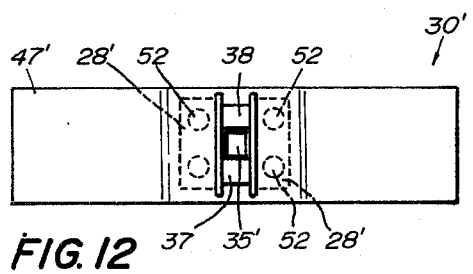
FIG. 12 shows the cleat of FIG. 10 as viewed from its sprocket engaging side.
Figure 7:
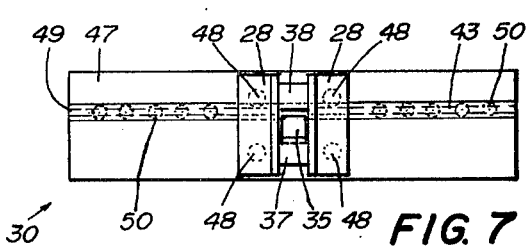
FIG. 7 shows the cleat of FIG. 5 as viewed from its sprocket engaging side.
Figure 13:
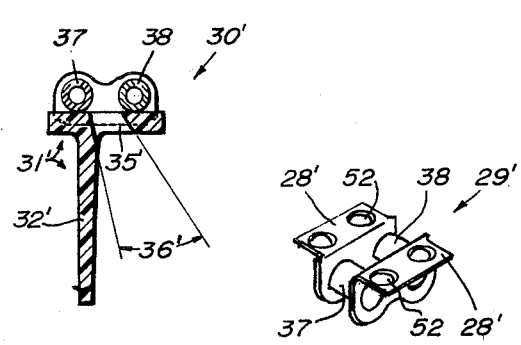
FIG. 13 shows a sectional side view of a cleat of FIG. 10, sectioned along line 13—13 marked on FIG. 11.
Figure 14:
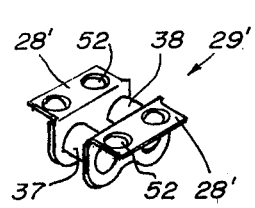
FIG. 14 shows a separate attachment link which forms a part of the cleat of FIG. 10.
Figure 8:
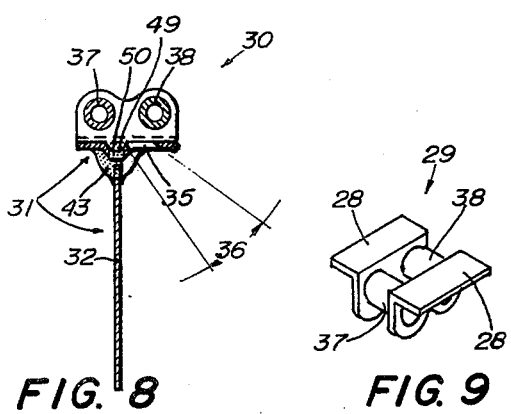
FIG. 8 shows a sectional side view of the cleat of FIG. 5, sectioned along line 8—8 marked on FIG. 6.
Figure 9:
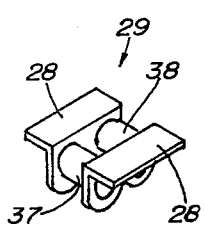
FIG. 9 shows a separate attachment link which forms a part of the cleat of FIG. 5.

The tread 15 has an endless linked chain 27 which is supported on the sprockets 16 & 17, and a plurality of spaced propulsion cleats 30. Each of the cleats 30 has a snow engaging side (note FIGS. 5 & 10), opposite from a sprocket engaging side (note FIGS. 7 & 12).

In the application, two cleat embodiments are used to illustrate the invention. A first embodiment (note FIGS. 3, 5, 6, 7, 8 and 9) is designed to negotiate all kinds of snow conditions, including snow covered with an icy crust, and it is more intended for a power-driven ski to be used by workers of utility companies or similar professional outdoors men. A second embodiment (note FIGS. 4, 10, 11, 12, 13 and 14) is designed to be effective in most snow conditions, and due to its soft construction it is deemed less likely to inflict any type of injury. It is, therefore, more appropriate for the leisure type of user, which may include young boys and girls. In discussing the generic aspects of the cleats' construction both embodiments will be discussed simultaneously; however, parts of the first embodiment which will be designated by a certain numeral will be designated by the same apostrophied numeral, which will follow in the text the original number in parenthesis. Specific structural aspects of both cleats will be separately discussed thereafter.

Noting the various figures, it can be seen that a propulsion cleat comprises;

a cleat attachment link 29, 29' which forms a part of the chain 27 and has an attachment plate 28, 28', a snow engaging section 31, 31' attached to the plate 28, 28' and having a protruding portion 32, 32' on the snow engaging side of the cleat for engaging with snow, and a venting passage 35, 35' communicating the sprocket engaging side with the snow engaging side for preventing snow entrapment between the cleat 30 and the sprockets 16 & 17. The venting passage 35, 35' has an increasing cross sectional area as it progresses from the sprocket engaging side to the snow engaging side, to assure that snow and other debris that have been forced into its narrower opening will be able to continue the venting passage 35, 35'. This last feature is noted on FIGS. 8 & 13 by the angle 36, 36'. Without the benefit of the venting passage snow tends to pack between rollers 37 & 38 and prevents the cleat 30 from properly meshing with the sprockets 16 & 17 when the cleat rides over the sprocket. Specifically, when the tread advances to engage a snow packed attachment link with the sprocket, it rides up on the tip of a tooth 39 of the sprocket (due to the entrapped snow), over-tensioning the chain all around, over-stressing the rollers 37 & 38, the sprocket tooth 39, and the links adjacent to the attachment link, which also mesh improperly with the sprockets 16 & 17. Further, when the attachment link moves from over the sprocket into a groove 40 formed in the body 21 after riding the tooth tip, it drops into it (instead of smoothly moving into) hammering, and often breaking, the body 21. The vent passage 35, (35') opens, at the snow engaging side of the cleat, behind the protruding portion (32') so that it is sheltered by it from the snow that is being packed into the cleat, on the front side of the protruding section 32, (32'), as the cleat thrusts against the snow.

Figure 4:
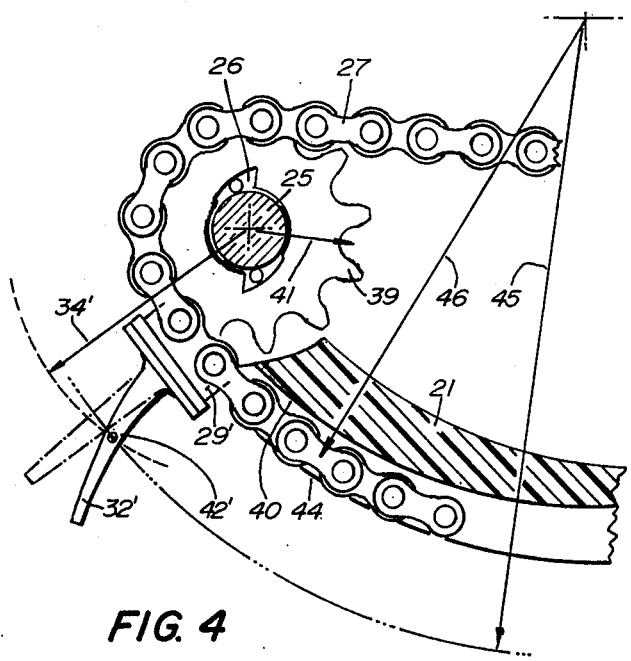
FIG. 4 is a side view of the drive sprocket area of the power-driven ski, showing a propulsion cleat ending its swing over and around the drive sprocket.
Figure 3:
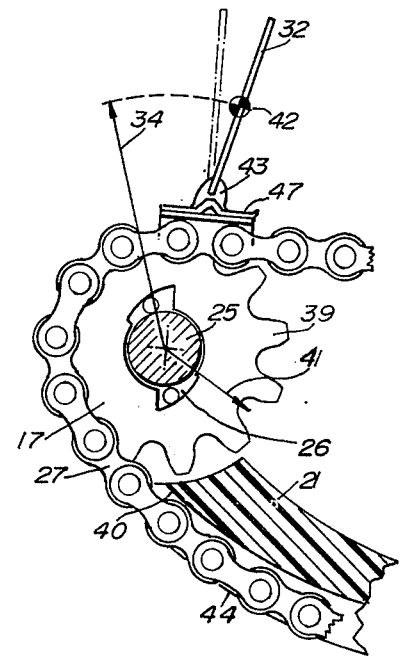
FIG. 3 is a side view of the drive sprocket area of the power-driven ski, showing a propulsion cleat starting its swing over and around the drive sprocket.

As the cleat starts to swing over and around the sprocket 17, the center of gravity 42, 42' of its protruding portion accelerates from a speed $v$, equalling $S x R_{41}$, to a velocity $V$, equalling $S x R_{34}$, where $S$ is the angular velocity of the sprocket 17, $R_{41}$ (indicated by numeral 41) is the pitch-line radius of sprocket 17, and $R_{34}$ (indicated by numeral 34) is the radius of the trajectory of the center of gravity 42 as it swings around the sprocket 17 (note FIGS. 3 & 4). If the cleat 30, 30' would have been rigid, then the acceleration rate would have been extremely high, resulting in a destructive shock developing between the cleat and the sprocket. However, with the resilient connection 43, first, the protruding section 31, 31' is allowed to swing backwards, as shown in FIG. 3 in solid lines, and then, gradually, to straighten to its normal position, shown in phantom lines on FIG. 3, thereby reducing the acceleration rate several folds, and second, limiting the maximum shock force that the protruding portion 31, 31' can impose on the other parts of the cleat in reaction to its acceleration.

As the cleat ends its travel over the sprocket 17 (note FIG. 4), and starts its travel over an arched ramp 44 in a groove 40, the velocity of the center of gravity 42, 42' is reduced from $V$ to $v_{arc}$, where $v_{arc}$ equals $v x R_{45}/R_{46}$, where $R_{45}$ (indicated by numeral 45) is the radius of the trajectory of the center of gravity 42, 42' when the cleat moves over the ramp 44, and $R_{46}$ (indicated by numeral 46) is the radius of the pitch-line of the chain 27 when it travels over the ramp 44. At this point, if the cleat 30, 30' was rigid, the decelerating protruding portion 31, 31' would have urged the attachment link to swivel, thrusting its front part on into the groove 40, and generating a destructive shock therein between.

However, here too, due to the resilient connection between the protruding portion 31, 31' and the rest of the cleat, first, the deceleration rate of the protruding portion 31, 31' is reduced, and second, the resilient connection both limits the forces transmitted to the attachment link and absorbs the motion, as shown in FIG. 4 in solid lines (the normal position of the protruding portion is shown in phantom lines). In a similar manner, the resilient connection prevents destructive shocks from developing between the attachment link 29, 29' and the sprocket 16 and the ski body 21, when the protruding portion 31, 31' accelerates and decelerates over the sprocket 16.

At this point the specific structure of the two embodiments will be reviewed:

FIGS. 5, 6, 7 and 8 show views of the first embodiment 30 from the snow engaging side, from the rear, from the sprocket engaging side and from the side, respectively. The cleat comprises the attachment link 30, shown in FIG. 9, which has the attachment plate 28 and the rollers 37 & 38. This attachment link is a slightly modified commercially available roller chain attachment link. To this attachment plate a roof plate 47 is attached by four spot weldments 48. The roof plate contains a ridge 49 along which a plurality of holes 50 are spaced. A resilient plastic, such as polyurethane, forms the resilient connection 43 which is encapsulating the ridge 49 and also connects to one edge of the protruding portion 31, which is also perforated with a plurality of holes 51 (one shown). The resilient connection material is molded directly onto these two parts to achieve good surface adherence and mechanical bond through the holes 50 & 51. Preferably, the protruding section 31 and the roof plate 47 are to be made of carbon steel or hardenable stainless steel, and hardened to around 40 on the $R_c$ scale. The venting passage 35 widens towards the snow engaging side of the cleat as indicated by angle 36.

FIGS. 10, 11, 12 and 13 are views of the second embodiment 30' from the snow engaging side, from the rear, from the sprocket engaging side and from the side, respectively. The second embodiment comprises the attachment link 29', shown separately in FIG. 14, which is a slightly modified commercially available roller chain attachment link, having an attachment plate 28' defining four holes 52. The snow engaging section is made of a resilient material (preferably polyurethane, having a hardness of approximately 45 shore on an A hardness scale), which is molded directly onto the attachment plate 28', encapsulating it and thereby adhering to it, and bridging itself through the holes 52. The venting passage 35', that widens towards the snow engaging side as marked by angle 36', is indicated by the numeral 35'.

While the present invention has been illustrated by a limited number of embodiments, it is understandable that modifications and substitutions can be made by one skilled in the art, without departing from the spirit of the invention or the scope of the claims.

I claim:

1. In a power driven ski type of a device using a tread of the type having an endless linked chain, circulateably supported by sprockets, and a plurality of spaced propulsion cleats, each of said cleats having a snow engaging side opposite from a sprocket engaging side, a propulsion cleat comprising in combination, a cleat attachment link forming part of said chain and having an attachment plate, and a snow engaging section attached to said attachment plate and having a protruding portion made of a resilient material on the snow engaging side of the cleat for engaging with snow, wherein said protruding portion is resiliently connected to said attachment link, for preventing the creation of a destructive shock by said protruding portion between said attachment link to said sprocket and said power driven ski type of a device, when said protruding portion accelerates and decelerates over said sprocket.

2. A propulsion cleat as in claim 1, wherein said protruding portion is molded directly onto said attachment plate.

3. A propulsion cleat as in claim 1, wherein said cleat has a venting passage communicating said sprocket engaging side with said snow engaging side for preventing snow entrapment between said cleat and said sprocket.

4. A propulsion cleat as in claim 3, wherein said venting passage has an increasing cross sectional area as it progresses from the sprocket engaging side towards the snow engaging side.

5. A propulsion cleat as in claim 3, wherein said venting passage communicates said sprocket engaging side of the cleat with the snow engaging side in an area behind the line which the protruding section connects to the cleat, whereby said protruding section shelters the venting passage from snow thrust by the cleat.

6. In a power driven ski type of a device, a tread having a plurality of cleats attached to a chain, comprising in combination, said chain adapted to being circulateably supported by sprockets, said chain containing a plurality of cleats' attachment links each having an attachment plate, a snow engaging section attached to said attachment plate and having a protruding portion made of a resilient material on a snow engaging side of said cleat for engaging with the snow, wherein said protruding portion is resiliently connected to said attachment link, for preventing the creation of a destructive shock by said protruding portion between said attachment link to said sprocket and said power driven ski type of a device, when said protruding portion accelerates and decelerates over said sprocket.

7. A tread as in claim 6, wherein said protruding portion is molded directly onto said attachment plate.

8. A tread as in claim 6, wherein said cleat has a venting passage communicating said cleat's sprocket engaging side and snow engaging side for preventing snow entrapment between said cleat and said sprocket.

9. A tread as in claim 8, wherein said venting passage has an increasing cross sectional area as it progresses from the sprocket engaging side towards the snow engaging side.

10. A tread as in claim 8, wherein said venting passage communicates said sprocket engaging side of the cleat with the snow engaging side in an area behind the line at which the protruding section connects to the cleat, whereby said protruding section shelters said venting passage from snow thrust by the cleat.

* * * * *